US007984131B1

(12) United States Patent
Gandhi et al.

(10) Patent No.: US 7,984,131 B1
(45) Date of Patent: Jul. 19, 2011

(54) NETWORK CONFIGURATION HISTORY TRACKING

(75) Inventors: Rajesh K. Gandhi, Shrewsbury, MA (US); Venkata R. Tiruveedi, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 560 days.

(21) Appl. No.: 11/769,790

(22) Filed: Jun. 28, 2007

(51) Int. Cl.
*G06F 15/16* (2006.01)
*G06F 15/173* (2006.01)
*G06F 7/00* (2006.01)
*G06F 17/00* (2006.01)

(52) U.S. Cl. ........ 709/223; 709/200; 709/203; 709/224; 707/609; 707/695

(58) Field of Classification Search .................... None
See application file for complete search history.

(56) References Cited

U.S. PATENT DOCUMENTS

| 6,282,175 | B1* | 8/2001 | Steele et al. | 709/224 |
| 6,999,977 | B1* | 2/2006 | Norcott et al. | 707/999.102 |
| 2003/0149756 | A1* | 8/2003 | Grieve et al. | 709/223 |
| 2004/0059701 | A1* | 3/2004 | Fedorov | 707/1 |
| 2006/0031427 | A1* | 2/2006 | Jain et al. | 709/220 |
| 2006/0041658 | A1* | 2/2006 | Nelson et al. | 709/224 |
| 2007/0094378 | A1* | 4/2007 | Baldwin et al. | 709/223 |
| 2007/0124520 | A1* | 5/2007 | Harima et al. | 710/104 |

* cited by examiner

*Primary Examiner* — Hassan Phillips
(74) *Attorney, Agent, or Firm* — Krishnendu Gupta; Gerald P. Kazanjian (57) ABSTRACT

A SAN management application maintains configuration information in a near real-time (RT) manner for timely and accurate responses to queries. A database manager responsive to the management application aggregates information concerning both current and historical configurations by combining current and historical information sets as a common (DB) database portal responsive to an individual query for configuration data from both current and historical data. The common portal avoids redundant and duplicative entries between the current and historical information sets, and is responsive to the management application for maintaining each change on only one of the current and historical information sets. Configuration changes add, update and move data items between the current and historical information sets, but need not store a configuration change in both the current and history information sets.

19 Claims, 7 Drawing Sheets

NETWORK CONFIGURATION HISTORY TRACKING

BACKGROUND

In a configured information network, such as a storage area network (SAN), a network fabric, or infrastructure, interconnects network elements, or nodes, for providing various services to end users that are also connected to the network. In a storage area network, for example, a number of storage arrays are adapted to provide data storage and retrieval services. The storage arrays connect to other elements such as switches and hosts to efficiently provide the services to the users. Further, each storage array includes a set of individual storage devices (e.g. disk drives) that are themselves considered network elements. The collection of elements defines a configuration of the SAN that is often updated to respond to changes in the network, such as for performance improvements, message traffic redirection, and equipment failures.

In a typical information network such as a SAN, a management application monitors the state of network elements and responds to queries about the network configuration. A conventional database arrangement stores data about the configuration, typically as a set of entries about relationships between the elements stored in relational database tables. For example, as discussed above, a storage array includes a plurality of storage devices and connects to one or more switches or routers that in turn connect to host computers (hosts). In a conventional network, substantive data throughput is paramount. In a SAN, timely and efficient delivery of data to users must remain the priority of the network. Accordingly, it is desirable that configuration management operations do not hinder effective delivery of network services to users.

SUMMARY

In a configured information network, interconnections and inclusions form relationships between network elements. A state of the relationships between the elements deployed in the network defines a current configuration. Previous configurations are also maintained as an ongoing configuration history. Current and historical configuration information is responsive to user queries concerning the configuration. Configurations of the invention are based, in part, on the observation that conventional database tracking mechanisms tend to accumulate large history trails that require subsequent indexing of large tables for maintaining the history entries (i.e. DB table records). More dynamic entries, such as those pertaining to a current configuration, may be offloaded into a current table or file, however conventional mechanisms typically duplicate current entries in the history files, thus requiring parsing or indexing of conventional historical entries nonetheless. Conventional history tracking arrangements therefore, suffer from the shortcoming that computationally expensive I/O (Input/Output) database operations of large history sets and/or tables are required to maintain the conventional history. Accordingly, configurations herein substantially overcome such shortcomings by maintaining configuration history entries in current and historical logs that prevent redundant historical and current entries and avoid parsing of extensive historical entries. Configurations herein, therefore, store each occurrence of a configuration change on either the current or history tables, but not both.

In the system disclosed herein, a management application maintains the configuration information in a near real-time (RT) manner for timely and accurate responses to queries. A database manager responsive to the management application aggregates information concerning both current and historical configurations by combining current and historical information sets as a common (DB) database portal responsive to an individual query for configuration data from both current and historical data. The common portal avoids redundant and duplicative entries between the current and historical information sets, and is responsive to the management application for maintaining each change on only one of the current and historical information sets. Configuration changes add, update and delete data items (entries) in the current and historical information sets, but need not redundantly store a configuration change in both the current and history information sets.

Configuration changes modify only a current configuration table, and are moved to a historical (history) or archive table when superceded. The historical nature of a previous configuration entry is defined by its existence on the history table, rather than by a conventional timestamp marking a table entry. In an example configuration discussed further below, operable for tracking configurations changes in a storage area network (SAN), a database manager is responsive to a SAN management application for implementing configuration changes to the database repositories (i.e. tables). A trigger processor responds to database change request for additions, modifications, and deletions, and invokes appropriate processing to maintain the current and historical repositories in a consistent and accurate state. A view processor integrates database operations to selectively apply changes to the appropriate current or historical device configuration repository. The database manager therefore avoids extensive and duplicative operations for maintaining the configuration repository, and remains responsive to configuration queries from an operator console coupled to the SAN management application.

Typically, the current and historical repositories are database tables and the common portal may be a database view operable to combine multiple repositories such as tables in a common logical set accessible as a discrete database unit (i.e. table). In a particular arrangement, the configuration information is stored in database tables for the current and history data, respectively. The common portal may be defined as a database view on the current and history tables to aggregate the current and historical data sets for accessibility from a single SQL query, for example. Storage of current configuration information in the current table limits queries to current entries, and avoids parsing historical entries to identify current entries comingled with historical entries, such as those immediately prior to a current entry. Similarly, entries indicative of the current configuration need not be marked and duplicated in the historical table pending a future update to the current configuration.

In further detail, the method of maintaining a change record as discussed further below includes receiving an indication of a change for recordation in a repository, the repository for monitoring network configuration, and identifying a current portion of the repository and a history portion of the repository. The history portion and current portions may be database tables responsive to a database manager, as in the example shown. The management application stores the received change in the current portion, in which the current portion is reflective of a current configuration of the network, and stores, if the received change supercedes an item in the current portion, the superceded item in the history portion. The history portion is reflective of previous configuration states, such that each item in the current portion not duplicative of the superceded item in the history portion. Accordingly, the management application selectively updates the history portion to reflect a previous state of the network configuration affected by the received change.

In a particular arrangement, adaptable to existing database applications, the method for maintaining a change record history as defined herein includes instantiating a view operable to combine the history table and the current table for access by a common query, and defining a trigger responsive to a change to the current table, such that the trigger is operable for propagating the update to the history table. The trigger is a set of instructions responsive to an incoming database change request reflecting configuration changes, and is operable to direct preexisting applications to look to the instantiated view instead of the history table and the current table, therefore providing for retrofitting of existing applications according to techniques herein.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
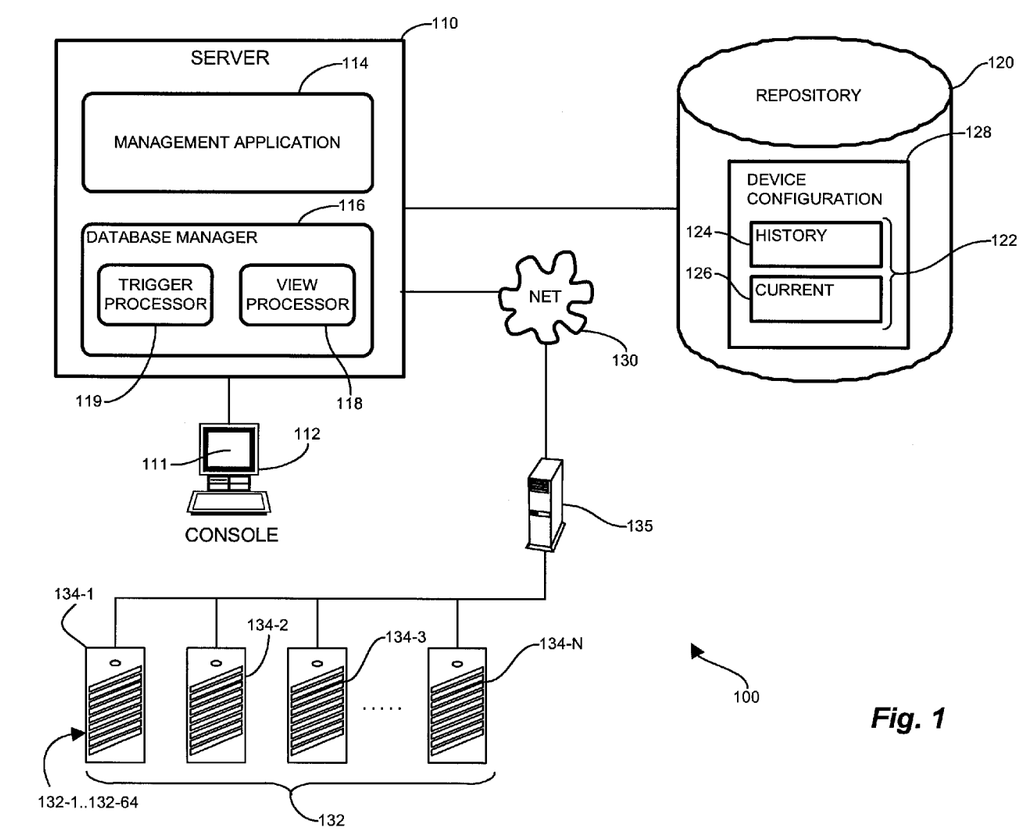
FIG. 1 is a context diagram of a configured information network environment suitable for use with the present invention.

In a configured information network, such as the example SAN discussed below, a management application aggregates both current and historical information concerning configurations by combining current and historical information sets as a common (DB) database portal responsive to an individual query for configuration data from both current and historical data. Configurations discussed herein employ a database view as the common portal for the current and historical data, however alternate mechanisms may be invoked for performing common access to the data sets as a logical unit. The common portal avoids redundant and duplicative entries between the current and historical information sets, and is responsive to the management application for maintaining each change entry on only one of the current and historical information sets FIG. 1 is a context diagram of an example configured information network suitable for use with the present invention. Referring to FIG. 1, a configured information network environment 100 includes a server 110 responsive to a console 112 and coupled to a repository 120 and a network 130. The server 110 includes a management application 114 and a database manager 116. The management application 114 interacts with a user via a graphical user interface GUI 111 or other suitable means for receiving commands and issuing responses. The database manager 116 is responsive to the management application 114 for maintaining the repository 120 and responsive to inquires from the console 112.

The network 130 is an interconnection of network elements 132, collectively defining a network configuration (configuration) of elements. The current configuration, therefore, defines interconnections and relationships between the various interconnected elements and configuration of the elements at a particular point in time, sometimes called a snapshot. In the example configuration shown in FIG. 1, the network configuration is a storage area network (SAN) configuration and the elements include SAN elements such as storage arrays 134-1 . . . 134-N (134 generally) and host computers (hosts) 135. Other network elements 132 such as switches and routers may also be included in a particular configuration.

The repository 120 includes information about the device configuration of elements 132 stored as entries in database tables 122, or other suitable data objects. In the example arrangement, a history table 124 maintains the history of configuration as a record of changes to the configuration over time. A current table 126 stores the current configuration of the elements 132 in the network 130. The current 126 configuration, therefore, stores the state of current relations between the elements 132, such as connections, inclusions, and parallels. For example, a storage array 134-1 might be connected to a host 135, might include storage devices (disk drives) 132-1 . . . 132-64, and might be parallel (e.g. shadowed) to a failover storage array 134-2. Such relations are codified in the current table 126, and changes thereto codified in the history table 124. Further, both the current table 126 and the history table 124 are included in a device configuration view 128, which aggregates the tables 124, 126 as a logical entity such that common fields in both may be referenced by a single command from the database manager 116.

The database manager 116 includes a view processor 118 and a trigger processor 119. The view processor 118 allows multiple objects in the repository 120 to be accessed as a single virtual entity, such as the device configuration view 128 allowing access to both the current table 126 and the history table 124. The trigger processor 119 is responsive to change requests to particular database tables 122 and is operable to perform a predetermined set of instructions, such as a script (discussed further below), upon detecting a particular command. In the example arrangement, the trigger processor 119 executes scripts (FIG. 3, below) for propagating changes to multiple tables 122 and maintaining consistency in the database 120. Further, it should be noted that the example configuration change tracking is applicable to alternate information types for efficiently maintaining a change history of information stored and updated in database tables 122.

Figure 2:
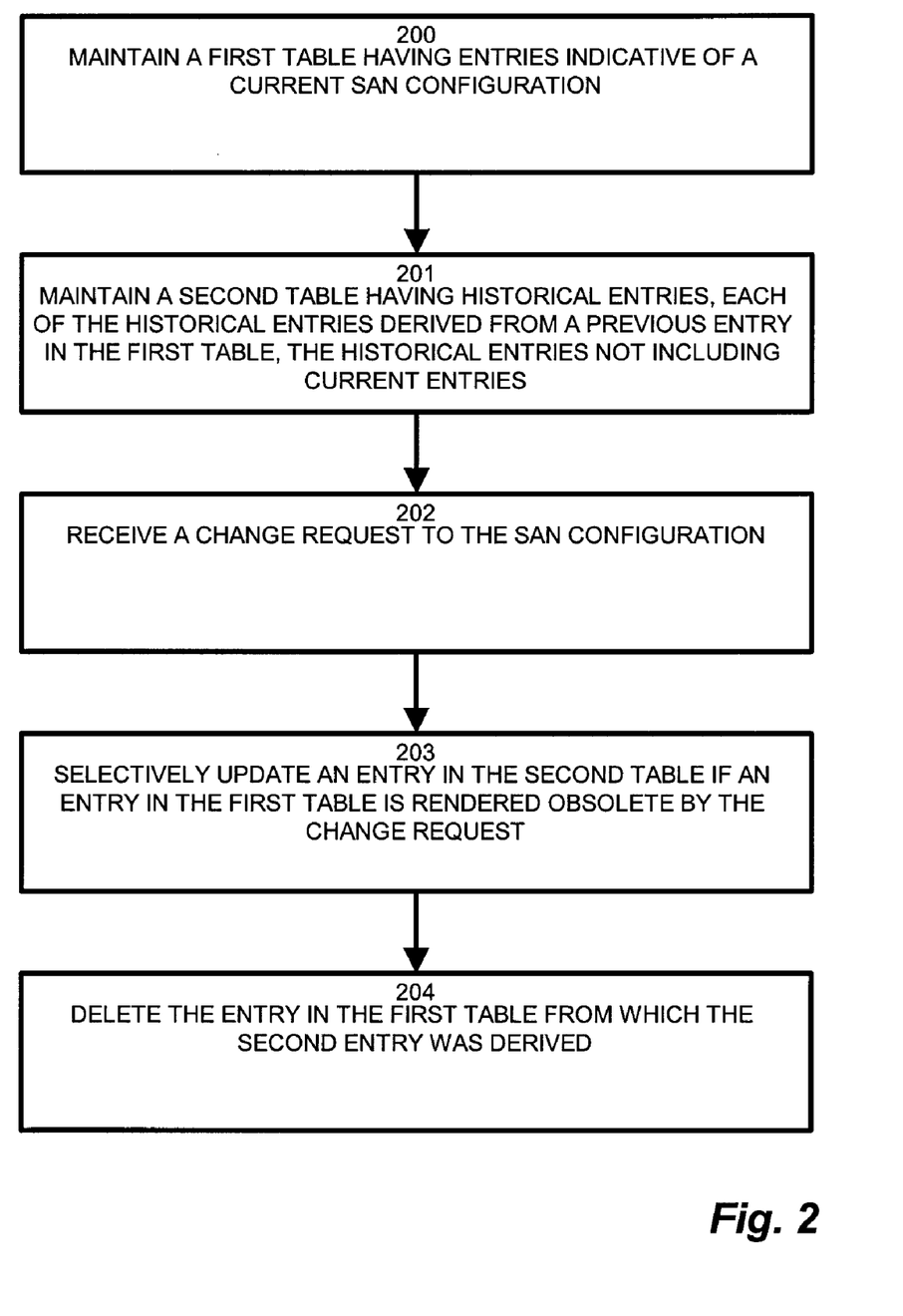
FIG. 2 is a flowchart of history processing in the environment of FIG. 1.

FIG. 2 is a flowchart of history processing in the environment of FIG. 1. Referring to FIGS. 1 and 2, the method for tracking configuration changes in a network as defined herein includes storing the current configuration data in a first table 126 having entries indicative of a current SAN configuration, as disclosed at step 200. The management application stores the historical configuration data in a second table 124 having historical entries, such that each of the historical entries is derived from a previous entry in the first table 126, and in which the historical entries do not include or duplicate current entries, as depicted at step 201 In other words, since the history data represents previous configuration entries, or configuration states, the current entries migrate to the history table when superceded, thus avoiding storing the same or similar entries in multiple locations.

At successive points in time, the management application 114 receives an update request to the SAN configuration, as shown at step 202. The management application 114 invokes the trigger processor 119 via the database manager 116 for propagating the update to the corresponding tables 122. The trigger processor 119 watches for incoming updates to the tables 122, and modifies the tables 122 accordingly using the view processor 118 to access the tables 122 as a single logical unit. Depending on whether the change is an add/insert, an update, or a delete, the trigger processor 119 selectively updates an entry in the second table (history 124) if an entry in the first table (current 126) is rendered obsolete by the update request, as depicted at step 203. The trigger processor 119 then, in the case of an update or deletion from the current configuration, deletes the entry in the first table 126 from which the second table 124 entry was derived, as shown at step 204.

Figure 3:
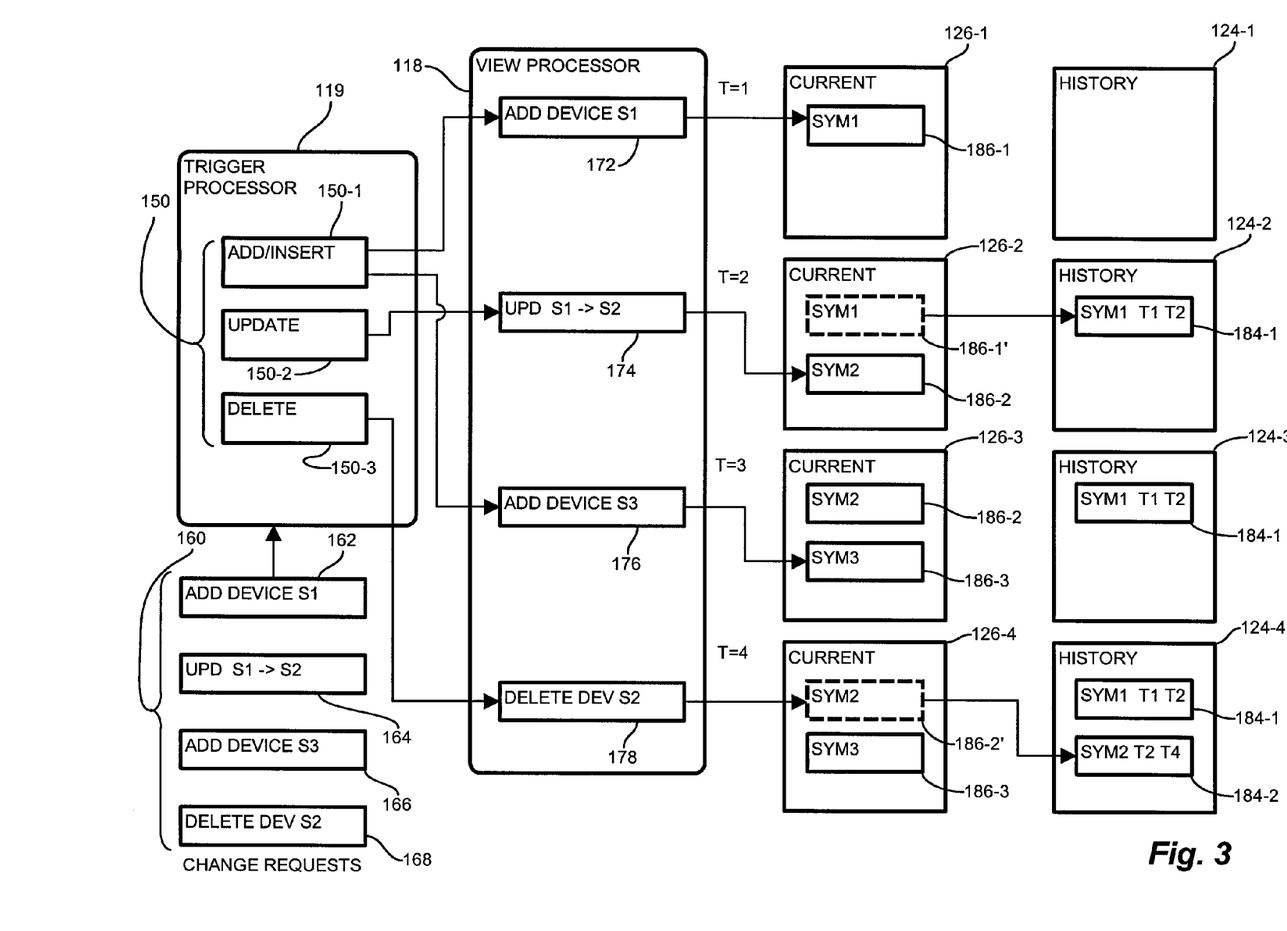
FIG. 3 is an example configuration of a SAN environment operable according to the history processing of FIG. 2.
Figure 4:
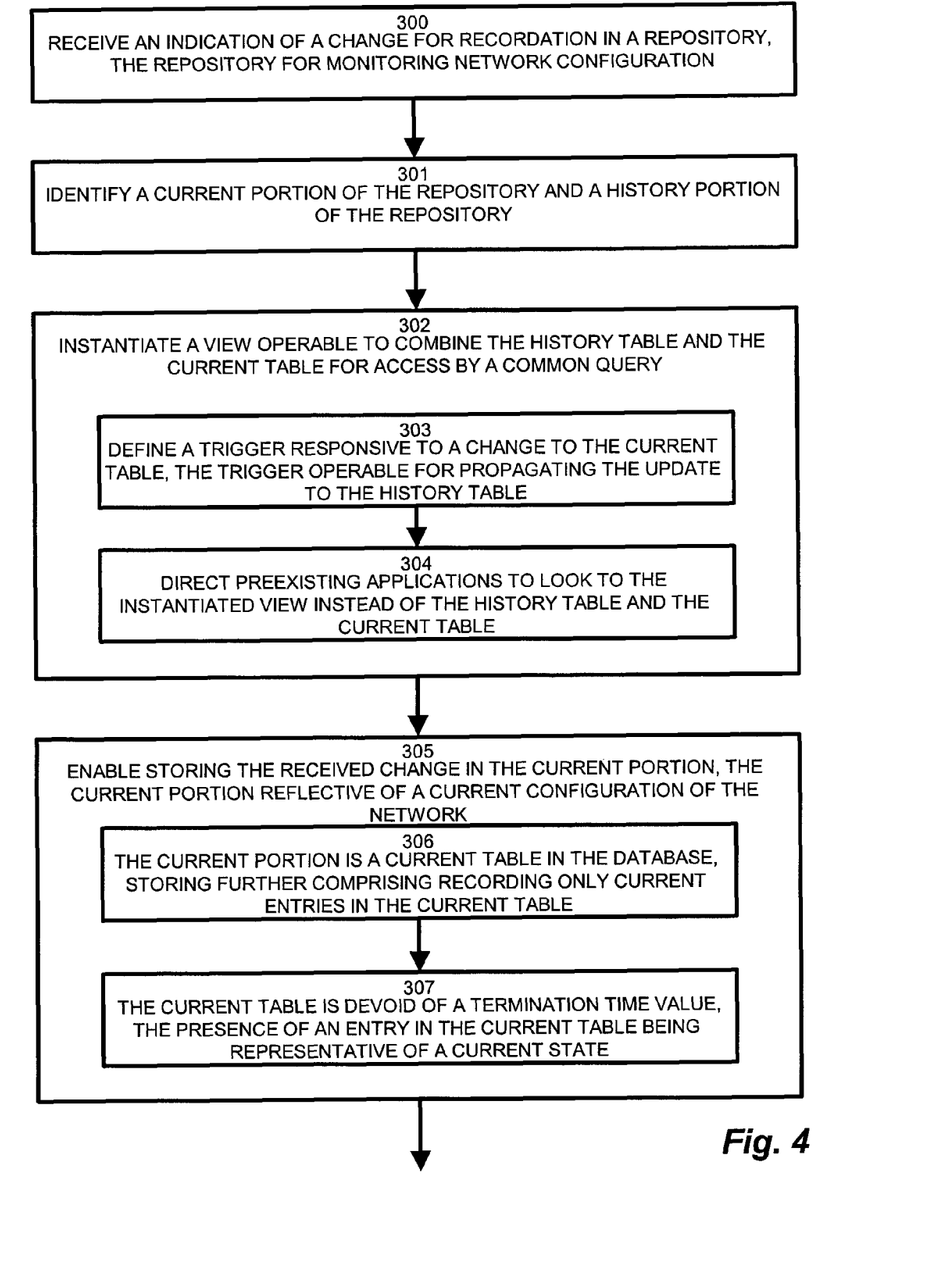
FIGS. 4-7 are a flowchart of configuration history processing in the configuration of FIG. 3.
Figure 5:
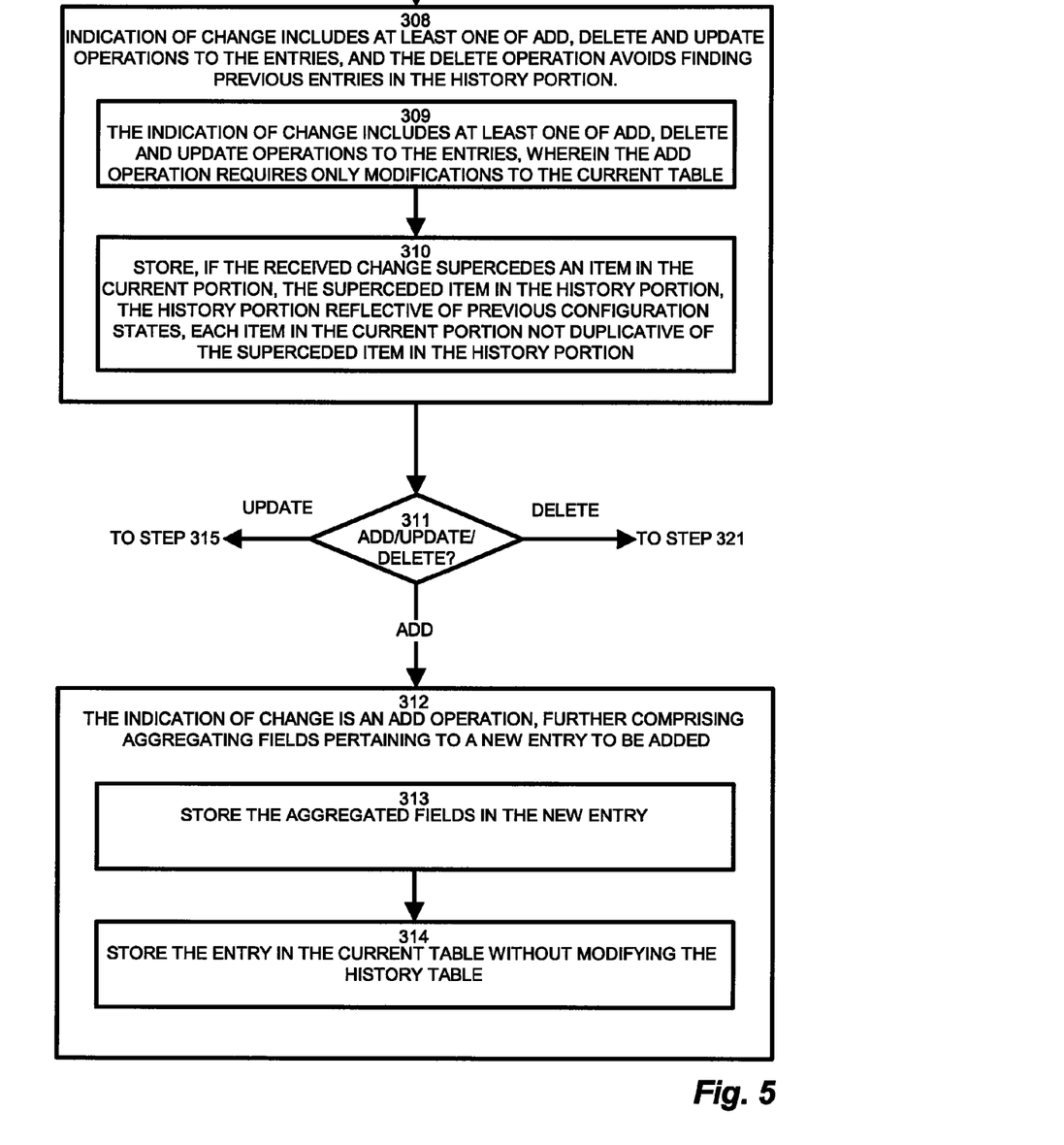
Figure 6:
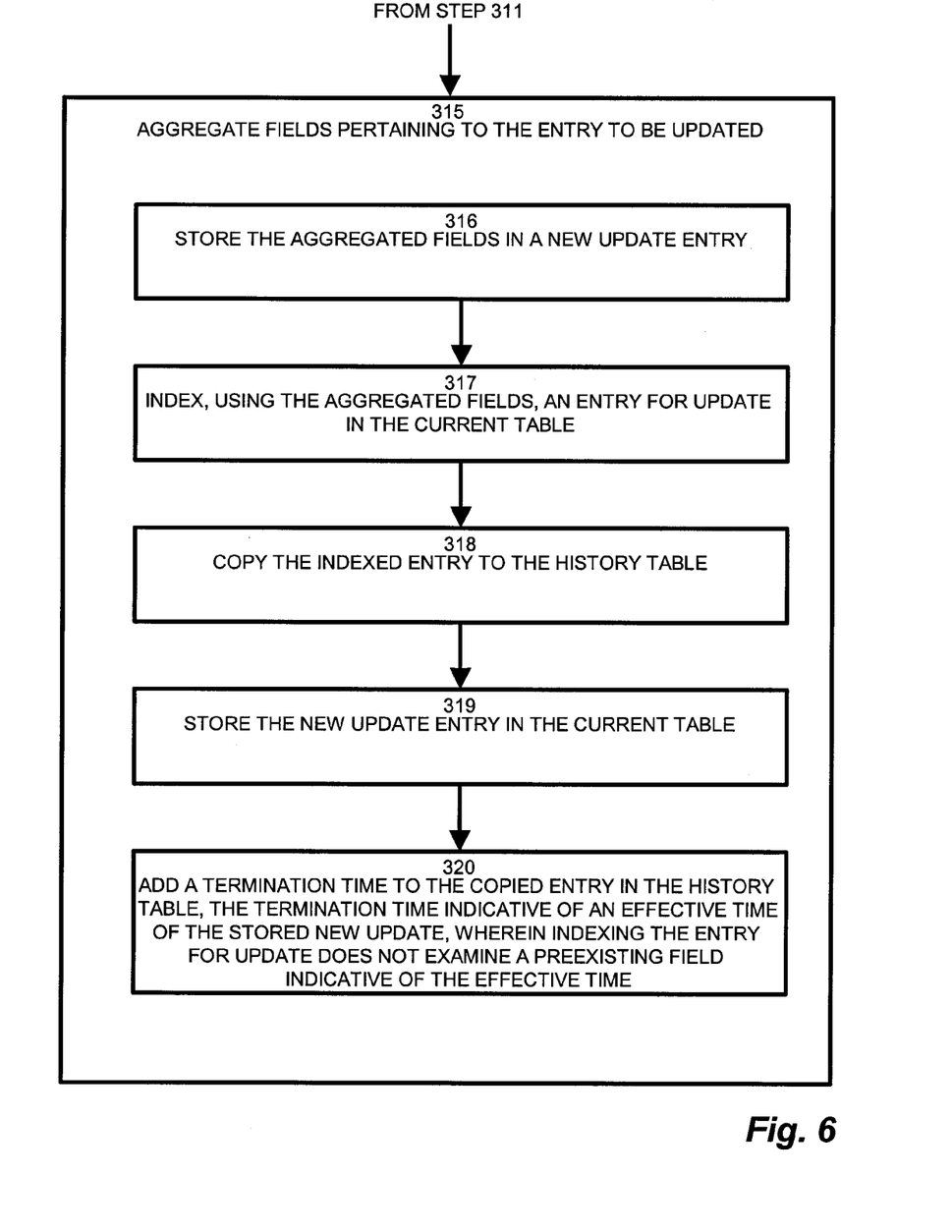
Figure 7:
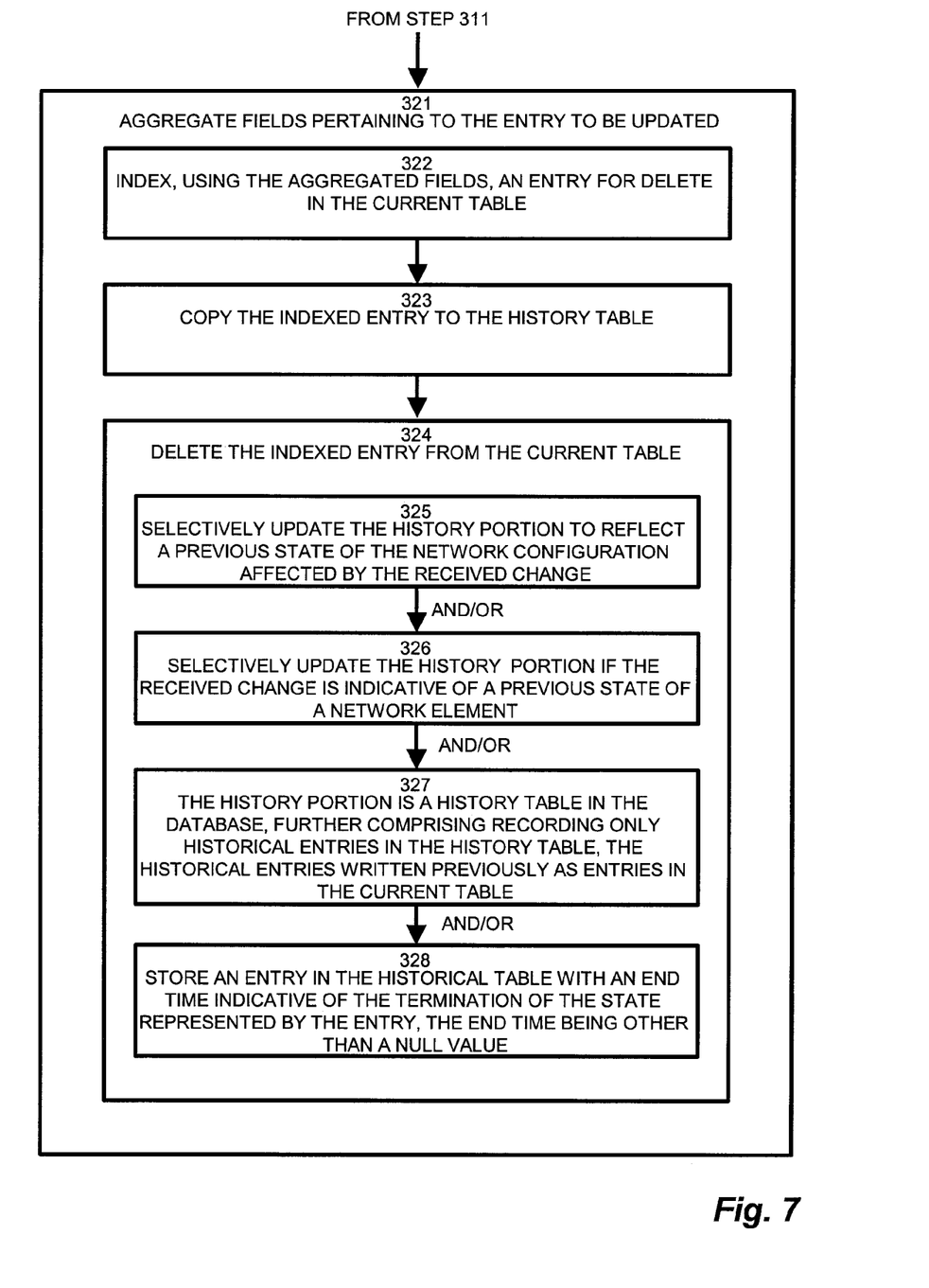

FIG. 3 is an example configuration of a SAN environment operable according to the history processing of FIG. 2. Referring to FIGS. 1 and 3, a sequence of configuration changes 160 and the corresponding tables 122 are shown. The sequence of configuration changes 160 includes changes 162, 164, 166 and 168, arriving at time T1, T2, T3 and T4, respectively. The database manager 116, upon receiving each of the changes 160, employs the trigger processor 119 to selectively invoke instructions 160 depending on the type of configuration change. The trigger processor 119 includes instructions 150 for adds (insertions) 150-1, updates 150-2 and deletions 150-3. The view processor 118 receives the change as an entry 172, 174, 176 and 178 respectively, and applies the entry to the corresponding tables 122. In the example shown, current and historical entries are written respectively as 186-1 . . . 186-N (186 generally), and 184-1 . . . 184-N (184, generally).

Referring now to the specific changes 160 received at T1 . . . T4, at T1 change 162 is received to add a Symmetrix Device (S1). The trigger processor 119 identifies the change 162 as an add, and invokes instructions 150-1. In the case of an add, the entry 172 is not superceding a previous entry, and therefore there is no history information to update to the history table 124. Accordingly, the view processor 118 writes the entry 172 to the current table 126-1 as entry 186-1 at time T1. The view processor 118 does not write any entries to the history table 124-1 for time T1, thus saving computationally expensive traversal of history data.

At time T2, an update 164 to S1 arrives, replacing S1 with configuration data S2. The trigger processor 119 identifies an update, and invokes instructions 150-2 to process entry 174.

An update supercedes a previous entry in favor of revised or modified data, so the view processor 118 moves the entry 186-1 to the history table 124-2 as entry 184-1. The current entry 186-1' is deleted from the current table 126-2, and entry 186-2 stored in the current table 126-2 to reflect the current configuration at time T=2. Since the history table entry 184-1 is being added for the first time, no previous entry in the history table needs to be indexed, typically a computationally expensive lookup in conventional arrangements. Often, conventional arrangements would store both a current entry and a historical entry marked with a start timestamp, and add another timestamp in the history table to identify the end time, thus requiring two seek/lookup operations in the history table.

Configuration change 166 arrives at time T3, to add device S3. The add instructions 150-1 invoke the view processor 118 to write entry 176 to the current table 126-3 as entry 186-3 at time T3. The S2 entry 186-1 remains, and no modifications are made to the history table 124-3 for time T3. At time T4, a deletion change 168 arrives to delete S2. The trigger processor 119 invokes instructions 150-3, which moves entry 186-2 to the history table 124-4 as entry 184-2, thus deleting the entry 186-2 from the history table 126-4, shown by entry 186-2'. Typical configurations employ many more entries 184, 186 in the table 122, particularly in the history table 124.

FIGS. 4-7 are a flowchart of configuration history processing in the configuration of FIG. 3. Referring to FIGS. 1 and 3-6, the method of maintaining a change record in a database as defined herein includes, at step 300, receiving an indication of a change for recordation in a repository 120, in which the repository is for monitoring network configuration. The repository 120 may be a database having a database manager, and typically includes tables having entries. In the disclosed example, a current table 126 includes entries corresponding to a current configuration, and a history table 124 includes historical entries corresponding to previous database entries, therefore providing responsiveness to queries of previous configuration states.

The database manager 116 includes a view processor 118 for identifying a current portion of the repository and a history portion of the repository, as shown at step 301. The view processor 118 operates as a common portal allowing database commands to access both the current and history portions. Accordingly, the view processor 118 Instantiates a device configuration view 128 operable to combine the history table 124 and the current table 126 for access by a common query, as disclosed at step 302. This includes defining a trigger responsive to a change to the current table 126, such that the trigger is operable for propagating the update to the history table 124, as shown at step 303. The trigger corresponds to a set of instructions 150 invoked when a change 160 is received corresponding to one or more of the tables 122 in the view. Accordingly, the trigger processor 119 receives control when an incoming configuration change is received. Since the common portal provides a view to access multiple tables (e.g. current 126 and history 124), preexisting applications can be directed to the view rather than a specific table, and the changes selectively applied via the view processor 118 as defined herein. The trigger processor 119 therefore directs preexisting applications to look to the instantiated view instead of the history table 124 and the current table 126, as depicted at step 304.

Once established, the trigger processor enables the view processor 118 for storing the received change request 160 in the current portion 126, in which the current portion reflective of a current configuration of the network, if applicable, as shown at step 305. As indicated above, the "live" nature of the entries in the current configuration is indicated by their presence in the current table 126, while history table 124 lookups are sought to be avoided due to performance implications. In the example arrangement, the current portion is the current table 126 in the database, such that storing further comprising recording only current entries in the current table, as depicted at step 306. Therefore, additions to the configuration result in only writes to the current table 126, avoiding costly history table operations, until the entry actually becomes historical. Therefore, the current table is devoid of a termination time value, such that the presence of an entry in the current table is representative of a current state, as shown at step 307. Conventional arrangements may employ timestamp references to identify current and historical entries, which tends to burden operations concerned with only current data by requiring traversal of historical entries.

Depending on the type of the update, one or both of the current 126 and history 124 tables are updated. The database manager 116 evaluates the change 160, in which the indication of change (change request 160) includes at least one of add, delete and update operations to the entries, and the delete operation avoids finding previous entries in the history portion, as depicted at step 308. In the example arrangement shown, the indication of change includes at least one of add, delete and update operations to the entries, wherein the add operation requires only modifications to the current table 126, as depicted at step 309. Otherwise, processing the change request 160 will include storing, if the received change supercedes an item in the current portion, the superceded item in the history portion, in which the history portion is reflective of previous configuration states, such that each item in the current portion (table 126) is not duplicative of the superceded item in the history portion (table 124), as shown at step 310. Accordingly, a check is performed, at step 311, to identify whether an add, update or delete is being performed, and control passes to one of steps 312, 315 or 321, respectively.

In the case where the indication of change 160 is an add operation, the view processor 118 aggregates fields pertaining to a new entry to be added, as depicted at step 312. After aggregating (gathering) the fields, the view processor 118 stores the aggregated fields in the new entry, as shown at step 313, and stores the entry in the current table 126 without modifying the history table 124, as depicted at step 314. Since the new entry is current and has no previous existence, no history entries 184 need be written, thus avoiding an additional seek in the history table 124.

An update operation supercedes a previous entry in favor of a new entry. The previous entry is moved to the history table 124. Accordingly, if the indication of change 160 is an update operation, the view processor 118 aggregates fields pertaining to the entry to be updated, as shown at step 315. This includes storing the aggregated fields in a new update entry, as 186, as depicted at step 316, and indexing, using the aggregated fields, an entry for update in the current table 126, as disclosed at step 317. Upon finding the current entry 186 to be superceded, the trigger processor 119 moves or copies the indexed entry 186 to the history table 124, as shown at step 318, and stores the new update entry in the current table 126, as depicted at step 319. The view processor 118 then adds a termination time to the copied entry 184 in the history table 124, such that the termination time is indicative of an effective time of the stored new update (and thus the end of the configuration state of the superceded entry), in which indexing the entry for update does not examine a preexisting field indicative of the effective time, as depicted at step 320. Conventional approaches indicate a current entry in a history repository by a null termination time value, which requires parsing the history entry to find the null termination time indicating a current (non-terminated) entry 184. Since the disclosed system stores entries in the history table 124 only upon actually becoming historical, no null marking for duplicative current entries is performed.

If the change indication 160 is a deletion, then the view processor 118 aggregates fields pertaining to the entry to be updated, as depicted at step 321. This includes, at step 322, indexing, using the aggregated fields, an entry 186 for deletion in the current table 126, and moves or copies the indexed entry 186 to the history table 124, as depicted at step 323. Since the entry is not superceded, the view processor 118 also deletes the indexed entry 186 from the current table 126, such that indexing avoids a preexisting effective time value comparison or fetch, as disclosed at step 324. This provides, as indicated above, that conventional current entries may be marked with a null time, such that the current entry may be distinguished and fetched from among mixed current and historical entries, therefore selectively updating the history portion to reflect a previous state of the network configuration affected by the received change, as disclosed at step 325.

Accordingly, the deletion instructions 120-3 may further include selectively updating the history portion if the received change is indicative of a previous state of a network element, as depicted at step 326. As discussed above, the history portion is the history table 124 in the database, further operable to record only historical entries in the history table 124, as the historical entries 184 have been written previously as entries 186 in the current table 126, as shown at step 327. The view processor 118 stores the entry 184 in the history table 124 with an end time T(n) (T1 . . . T4 in the example shown) indicative of the termination of the state represented by the entry 184, such that the end time being other than a null value, thus avoiding null-value tagging of current entries 186 in the history table 124, as depicted at step 328.

Those skilled in the art should readily appreciate that the programs and methods for maintaining a change record trail as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for maintaining a change record has been particularly shown and described with references to embodiments thereof, it will be understood by those skilled in the art that various changes in form and details may be made therein without departing from the scope of the invention encompassed by the appended claims.

What is claimed is:

1. A method of maintaining a change record comprising:
receiving an indication of a change for recordation in a repository, the repository for monitoring configuration of a storage area network (SAN);
identifying a current table of the repository and a history table of the repository;
storing the received change in the current table, the current table reflective of a current configuration of the network, storing further comprising recording only current entries in the current table;
moving, if the received change supercedes an item in the current table, the superceded item from the current table to the history table, the history table reflective of previous configuration states, further comprising recording only historical entries in the history table, the historical entries written previously as entries in the current table, each item in the current table not duplicative of the superceded item in the history table;
selectively updating if the received change is indicative of a previous state of a SAN element, the history table to reflect a previous state of the network configuration affected by the received change; instantiating a view operable to combine the history table and the current table for access by a common query; and
directing preexisting applications to look to the instantiated view instead of the history table and the current table, thereby providing for retrofitting the preexisting applications for using common queries with a common portal provided by the instantiated view.

2. The method of claim 1 wherein the indication of change includes at least one of add, delete and update operations to the entries, wherein the add operation requires only modifications to the current table.

3. The method of claim 1 wherein the indication of change includes at least one of add, delete and update operations to the entries, and the delete operation avoids finding previous entries in the history table.

4. The method of claim 3 further comprising storing an entry in the history table with an end time indicative of the termination of the state represented by the entry, the end time being other than a null value.

5. The method of claim 4 wherein the current table is devoid of a termination time value, the presence of an entry in the current table being representative of a current state.

6. The method of claim 1 wherein the indication of change is an add operation, further comprising:
aggregating fields pertaining to a new entry to be added;
storing the aggregated fields in the new entry; and
storing the entry in the current table without modifying the history table.

7. The method of claim 1 wherein the indication of change is an update operation, further comprising:
aggregating fields pertaining to the entry to be updated;
storing the aggregated fields in a new update entry
indexing, using the aggregated fields, an entry for update in the current table;
copying the indexed entry to the history table;
storing the new update entry in the current table; and
adding a termination time to the copied entry in the history table, the termination time indicative of an effective time of the stored new update, wherein indexing the entry for update does not examine a preexisting field indicative of the effective time.

8. The method of claim 1 wherein the indication of change is a delete operation, further comprising:
aggregating fields pertaining to the entry to be updated;
indexing, using the aggregated fields, an entry for delete in the current table;
copying the indexed entry to the history table; and
deleting the indexed entry from the current table, the indexing avoiding a preexisting effective time value.

9. The method of claim 1 wherein the common portal established by the instantiated view executes queries configured for the current table or the history table provided by the preexisting applications to operate on the instantiated view for accessing both the current table and the history table.

10. The method of claim 9 wherein the view invokes the common portal operable to combine the history table and the current table for access by a common query.

11. A management server for tracking configuration changes in a storage area network (SAN) comprising:
a first table having entries indicative of a current storage area network (SAN) configuration for storing current configuration data;
a second table having historical entries for storing historical configuration data, each of the historical entries derived from a previous entry in the first table, storing further comprising recording only current entries in the first table, the historical entries not including current entries;
a trigger processor operable to receive a change request to the SAN configuration;
a view processor operable to selectively update an entry in the second table to reflect a previous state of the network configuration affected by the received change if an entry in the first table is rendered obsolete by the change request, the received change indicative of a previous state of a SAN element, and further operable to delete the entry in the first table from which the entry in the second table was derived and instantiate a view operable to combine the history table and the current table for access by a common query; and
the trigger processor further configured to direct preexisting applications to look to the instantiated view instantiated by the view processor instead of the first table and the second table, thereby providing for retrofitting the preexisting applications for using common queries with a common portal provided by the instantiated view.

12. The server of claim 11 wherein the view processor is operable to selectively update the second table if the received change is indicative of a previous state of a network element, storing further comprising recording only current entries in the first table, such that the view processor records only historical entries in the second table, the historical entries written previously as entries in the current table, and recording only current entries in the first table.

13. The server of claim 12 wherein the change request includes at least one of add, delete and update operations to the entries, wherein the add operation requires only modifications to the first table.

14. The server of claim 12 wherein the change request includes at least one of add, delete and update operations to the entries, and the delete operation avoids finding previous entries in the second table.

15. The server of claim 11 further comprising storing an entry in the second table with an end time indicative of the termination of the state represented by the entry, the end time being other than a null value, wherein the first table is devoid of a termination time value, the presence of an entry in the first table being representative of a current state.

16. The server of claim 11 wherein the change request is an add operation, the view processor further operable to:
- aggregate fields pertaining to a new entry to be added;
- store the aggregated fields in the new entry; and
- store the entry in the current table without modifying the history table.

17. The server of claim 11 wherein the change request is an update operation, the view processor further operable to:
- aggregate fields pertaining to the entry to be updated;
- store the aggregated fields in a new update entry;
- index, using the aggregated fields, an entry for update in the current table;
- copy the indexed entry to the history table;
- store the new update entry in the current table; and
- add a termination time to the copied entry in the history table, the termination time indicative of an effective time of the stored new update, wherein indexing the entry for update does not examine a preexisting field indicative of the effective time.

18. The server of claim 11 wherein the change request is a delete operation, the view processor further operable to:
- aggregate fields pertaining to the entry to be updated;
- index, using the aggregated fields, an entry for delete in the current table;
- copy the indexed entry to the history table; and
- delete the indexed entry from the current table, the indexing avoiding a preexisting effective time value.

19. A computer program product having a non-transitory computer readable storage medium operable to store computer program logic embodied in computer program code encoded as a set of processor based instructions thereon for maintaining a change record history of a storage area network (SAN) comprising:
- computer program code for instantiating a view operable to combine a history table and a current table for access by a common query;
- computer program code for defining a trigger responsive to a change to the current table, the trigger operable for moving, if the received change supercedes an item in the current table, the superceded item from the current table to the history table, moving further comprising recording only current entries in the current table, each item in the current table not duplicative of the superceded item in the history table and recording only historical entries in the history table, the historical entries written previously as entries in the current table;
- computer program code for selectively updating, if the received change is indicative of a previous state of a SAN element, the history table to reflect a previous state of the storage area network (SAN) configuration affected by the received change; and
- computer program code for directing preexisting applications to look to the instantiated view instead of the history table and the current table, thereby providing for retrofitting the preexisting applications for using common queries with a common portal provided by the instantiated view.

* * * * *